(12) United States Patent
Tomiyoshi et al.

(10) Patent No.: US 12,276,635 B2
(45) Date of Patent: Apr. 15, 2025

(54) ELECTROPHORESIS DEVICE AND FOREIGN MATTER DETECTION METHOD

(71) Applicant: HITACHI HIGH-TECH CORPORATION, Tokyo (JP)

(72) Inventors: Masashi Tomiyoshi, Tokyo (JP); Masashi Watanabe, Tokyo (JP); Takeshi Ooura, Tokyo (JP); Motohiro Yamazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 489 days.

(21) Appl. No.: 17/771,297

(22) PCT Filed: Nov. 11, 2019

(86) PCT No.: PCT/JP2019/044062
§ 371 (c)(1),
(2) Date: Apr. 22, 2022

(87) PCT Pub. No.: WO2021/095082
PCT Pub. Date: May 20, 2021

(65) Prior Publication Data
US 2022/0365025 A1 Nov. 17, 2022

(51) Int. Cl.
*G01N 27/447* (2006.01)
*G01N 21/01* (2006.01)
*G01N 27/453* (2006.01)

(52) U.S. Cl.
CPC . *G01N 27/44721* (2013.01); *G01N 27/44743* (2013.01); *G01N 2021/0193* (2013.01)

(58) Field of Classification Search
CPC . G01N 21/01; G01N 2021/0106–0143; G01N 2021/0162–0193; G01N 21/05; G01N 2021/052; G01N 2021/054
See application file for complete search history.

(56) References Cited

U.S. PATENT DOCUMENTS 6,013,168 A * 1/2000 Arai .................. G01N 27/44721
204/603
6,081,324 A * 6/2000 Yagita .................... G01N 33/15
356/237.1

(Continued)

FOREIGN PATENT DOCUMENTS

JP 2003-247980 A 9/2003
JP 2003-344356 A 12/2003

(Continued)

OTHER PUBLICATIONS

EPO machine-generated English language translation of JP 2012177599 A, published Sep. 13, 2012 (Year: 2012).*

(Continued)

*Primary Examiner* — Alexander S Noguerola
(74) *Attorney, Agent, or Firm* — Volpe Koenig (57) ABSTRACT

The present invention aims to provide an electrophoresis device which detects the presence or absence of foreign matter in a flow path 111. In order to solve the above problems, the electrophoresis device of the present invention is characterized by including a flow path 111 filled therein-side with a migration medium, a migration medium container which stores a migration medium, a liquid feeding mechanism which feeds the migration medium to the flow path 111, a photographing device 115 which photographs the flow path 111, and a control unit which analyzes an image of the flow path 111 photographed by the photographing device 115 and in that the control unit determines the presence or absence of the foreign matter in the flow path 111 on the basis of the image of the flow path 111.

14 Claims, 6 Drawing Sheets

(56) References Cited

U.S. PATENT DOCUMENTS

| | | | |
|---|---|---|---|
| 6,217,731 B1* | 4/2001 | Kane | G01N 27/44782 |
| | | | 204/451 |
| 2002/0108859 A1* | 8/2002 | Wang | B07C 5/34 |
| | | | 204/601 |
| 2002/0112959 A1* | 8/2002 | Xue | G01N 27/44743 |
| | | | 204/453 |
| 2003/0230488 A1* | 12/2003 | Lee | G01N 27/44743 |
| | | | 204/600 |
| 2004/0018638 A1 | 1/2004 | Shoji et al. | |
| 2004/0200723 A1* | 10/2004 | Sakai | G01N 27/44721 |
| | | | 204/601 |
| 2008/0110756 A1 | 5/2008 | Yamazaki et al. | |
| 2017/0343542 A1* | 11/2017 | Jitsuhara | G01N 21/6428 |

FOREIGN PATENT DOCUMENTS

| | | |
|---|---|---|
| JP | 2004-20224 A | 1/2004 |
| JP | 2006-119158 A | 5/2006 |
| JP | 2008-122169 A | 5/2008 |
| JP | 2010-145215 A | 7/2010 |
| JP | 2012-177599 A | 9/2012 |
| JP | 2017-215217 A | 12/2017 |

OTHER PUBLICATIONS

EPO machine-generated English language translation of JP 2006119159 A, published May 11, 2006 (Year: 2006).*

PCT/JP2019/044062 International Search Report mailed Feb. 4, 2020. 3 pages.

* cited by examiner

ELECTROPHORESIS DEVICE AND FOREIGN MATTER DETECTION METHOD

TECHNICAL FIELD

The present invention relates to an electrophoresis device, and particularly to foreign matter detection in a flow path.

BACKGROUND ART

A capillary electrophoresis device has a capillary array comprised of a singular or multiple capillaries and a pump mechanism for injecting polymer into the capillaries. The pump mechanism is provided with a flow path (hereinafter referred to as a pump flow path). Further, there are respectively provided ammeters that can detect a current flowing between an electrode in a cathode-side buffer solution and a high-voltage power supply, and a current flowing in an anode-side electrode between the electrode in the cathode-side buffer solution and ground. Foreign matter such as air bubbles and dust may be mixed into the pump flow path and the capillaries. In particular, when replacing the capillary or a polymer container connected to the pump mechanism, air bubbles are mixed into the pump flow path or the capillary at high frequency. During electrophoresis a high voltage is applied to the pump flow path and the capillary, and the foreign matter in the pump flow path or the capillary may act as a large resistance. This causes partial discharge, which can lead to damage to components such as capillaries and the main body of the device.

There has been disclosed in Patent Literature 1, a method of in order to detect an abnormality such as mixing of air bubbles into a pump flow path or a capillary, detecting a current value of a conduction path including the pump flow path or the capillary or the like is detected, and determining the state of the conduction path, based on the detected current value. It is possible to detect abnormalities in the pump flow path, capillary, etc. by a change in the current value, and prevent damage to the components and the main body of the device.

CITATION LIST

Patent Literature

PTL 1: Japanese Patent Application Laid-Open No. 2003-344356

SUMMARY OF INVENTION

Technical Problem

In Patent Literature 1, when an abnormality in the conduction path is detected by the current value, has been visually confirmed whether or not foreign matter such as air bubbles or dust is mixed in the pump flow path, in order to specify the cause of the abnormality. However, it was difficult to see the air bubbles and foreign matter in the pump flow path, and it was difficult to specify the air bubbles and foreign matter in the pump flow path.

In view of the above problems, it is an object of the present invention to provide an electrophoresis device which detects the presence or absence of foreign matter in a flow path.

Solution to Problem

In order to solve the above problems, an electrophoresis device of the present invention is characterized by including a flow Path filled thereinside with a migration medium, a migration medium container which stores a migration medium, a liquid feeding mechanism which feeds the migration medium to the flow path, a photographing device which photographs the flow path, and a control unit which analyzes an image of the flow path photographed by the photographing device and in that the control unit determines the presence or absence of the foreign matter in the flow path on the basis of the image of the flow path.

Advantageous Effects of Invention

An electrophoresis device of the present invention is capable of detecting the presence or absence of foreign matter in a flow path.

DESCRIPTION OF EMBODIMENTS

First Embodiment

Figure 1:
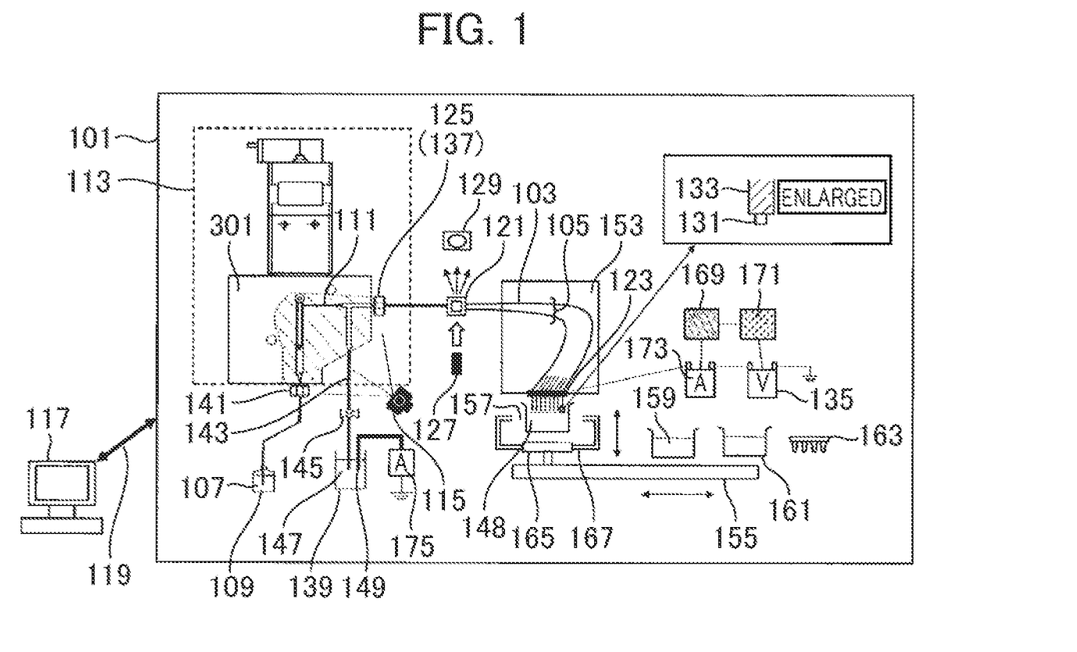
FIG. 1 is a schematic diagram showing a configuration of an electrophoresis device.

FIG. 1 is a schematic diagram of an electrophoresis device according to the present embodiment. Hereinafter, the configuration of the present device will be described with reference to FIG. 1.

The electrophoresis device 101 of the present embodiment includes a capillary array 105 comprised of a single or plurality of capillaries 103, a polymer container 109 which contains polymer 107, a pump mechanism 113 which is formed with a pump flow path 111 connecting the capillaries 103 and the polymer container 109, and feeds the polymer 107 in the polymer container 109 to the capillaries 103, and a photographing device 115 which photographs the pump flow path 111. The electrophoresis device 101 is connected to a computer 117. Although its details will be described later, the computer 117 analyses an image of the pump flow path 111 photographed the photographing device 115 and determines the presence or absence of foreign matter in the pump flow path 111.

The configuration of the electrophoresis device 101 will be described in detail.

The capillary array 105 is a replacement member including the single or plurality of capillaries 103. When changing a measuring method, the capillary array 105 is replaced to adjust the length of each capillary 103. Further, when the capillary 103 is damaged or deteriorates in Quality, the capillary array 105 is replaced with a new capillary array 105.

The capillary array 105 includes a detection unit 121, a load header 123, and a capillary head 125 in addition to the capillary 103.

The capillary 103 is made up of a glass tube with an inner diameter of several tens to several hundreds of microns and an outer diameter of several hundreds of microns. The surface of the glass tube is coated with polyimide to improve the strength. However, at a light irradiation position of the capillary 103 to which excitation light is irradiated, the polyimide film is removed so that the internal light emission easily leaks to the outside. The inside of the capillary 103 is filled with a separation medium for giving a difference in migration rate during electrophoresis. Although both fluidity and non-fluidity exist in the separation medium, the fluid polymer 107 is used in the present embodiment.

The detection unit 121 is configured so that the vicinity of the light irradiation position of each capillary 103 is arranged and fixed on an optical flat plane with an accuracy of a few microns in height. During electrophoresis, excitation light is irradiated by a light source 127 and continuously passes through the light irradiation positions of all capillaries 103. This excitation light causes information light from the sample (fluorescence having a wavelength which depends on the sample). This is emitted from the light irradiation position to the outside of the capillary 103. This information light is detected by the optical detector 129, where the sample is analyzed.

The load header 123 is provided at capillary cathode ends 131. The capillary cathode ends 131 are respectively fixed through metal-made hollow electrodes 133. The tin of the capillary 103 is in a state of protruding from the hollow electrode 133 by about 0.5 mm. Further, the hollow electrode 133 fixed for each capillary 103 is attached to the load header 123, so that the hollow electrode 133 and the load header 123 become integral. The hollow electrode 133 is conductive to a high-voltage power supply 135. Therefore, when it is necessary to apply a voltage through electrophoresis or sample introduction or the like, the hollow electrode 133 functions as a cathode electrode. Further, the electrophoresis device 101 is provided with a first ammeter 173 and a second ammeter 175 for detecting currents.

The capillary head 125 is a member which is attached to and detached from the pump mechanism 113 with pressure resistant airtightness. In the case of the plurality of capillaries 103, the capillary head 125 bundles capillary anode ends 137 into one.

Figure 2:
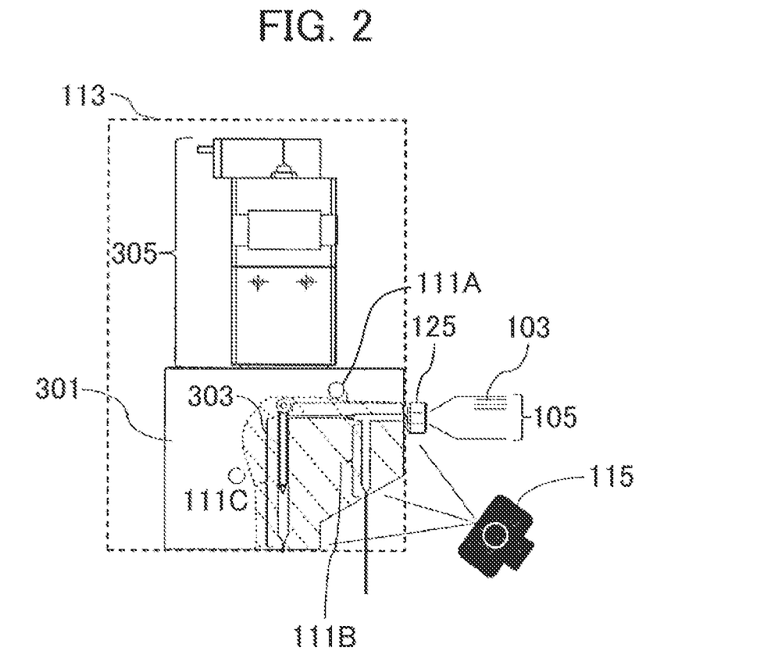
FIG. 2 is a schematic diagram of a pump mechanism.

The pump mechanism 113 will be described in detail with reference to FIG. 2. The pump mechanism 113 is mainly comprised of a block 301 formed with the pump flow path 111, a plunger 303 operating in the pump flow path 111, and a drive unit 305 for driving the plunger 303. The block 301 is a connecting part which causes the capillary array 105, an anode buffer container 139 (refer to FIG. 1), and the polymer container 109 (refer to FIG. 1) to communicate respectively, and is formed with the pump flow path 111 for connecting these. In the pump flow path 111, a flow path from the capillary connecting part to which the capillary head 125 is connected, to the plunger 303 is taken as a pump flow path 111A, a flow path for connecting the pump flow path 111A and the anode buffer container 139 is taken as a pump flow path 111B, and a flow path for connecting the pump flow path 111A and the polymer container 109 is taken as a pump flow path 111C. Then, the plunger 303 is driven within the pump flow path 111, so that the polymer 107 is filled into each capillary 103 from the capillary anode end 137 via the block 301. Refilling the polymer 107 in the capillary 103 is performed for each measurement to improve the performance of the measurement.

The plunger 303 moves in the pump flow path 111C. The drive unit 305 lowers the plunger 303 to thereby discharge the polymer 107 in the pump flow path 111C and feed the polymer 107 to the capillary 103 through the pump flow path 111A. Further, the drive unit 305 raises the plunger 303 to thereby enable the polymer 107 in the polymer container 109 to be sucked into the pump flow path 111C.

Description will be made again with reference to FIG. 1. A check valve 141 is provided between the polymer container 109 and the block 301. The check valve 141 has a function of allowing the polymer 107 flowing from the polymer container 109 to the block 301 and blocking the outflow of the polymer 107 from the block 301 to the polymer container 109. Therefore, when the polymer 107 is injected into the capillary 103, the polymer 107 is prevented from flowing back into the polymer container 109. Further, a connecting pipe 143 connecting the anode buffer container 139 and the block 301 is connected to the block 301. The connecting pipe 143 is provided with an electric valve 145. The electric valve 145 opens and closes the flow path between the block 301 and the anode buffer container 139. At least when injecting the polymer 107 into the capillary 103, the electric valve 145 closes the flow path between the block 301 and the anode buffer container 139 and thereby prevents the polymer 107 from flowing out to the anode buffer container 139. Further, when an electric current is passed through electrophoresis or the like, the flow path is opened to connect the block 301 and the anode buffer container 139. In addition, an electrode (GND) 149 is inserted into the anode buffer container 139 so as to be immersed in a buffer 147 in the anode buffer container 139.

The computer 117 is used in a state of being connected by a communication cable 119. The computer 117 can control the functions held by the electrophoresis device 101 and transfer data detected by the electrophoresis device 101.

Further, the electrophoresis device 101 includes a thermostatic bath 153 for keeping the capillary 103 at a constant temperature and a conveyor 155 for conveying various containers to the capillary cathode end 131.

The capillary 103 is arranged in the thermostatic bath 153 and heated to a predetermined temperature by the thermostatic bath 153.

The conveyor 155 conveys a cathode buffer container 157, a cleaning container 159, a waste liquid container 161, and a sample container 163 to the capillary cathode end 131 as needed. Although not shown in the drawing, the conveyor 155 is provided with three electric motors and a linear actuator, and can move a moving stage 165 provided on the conveyor 155 in three axial directions of up/down, left/right, and depth directions. Further, the moving stage 165 can carry at least one or more containers thereon. In addition, the moving stage 165 is provided with an electric grip 167 so that each container can be grabbed and released. Incidentally, unnecessary containers are stored in a predetermined storage location in the device 101.

Figure 3:
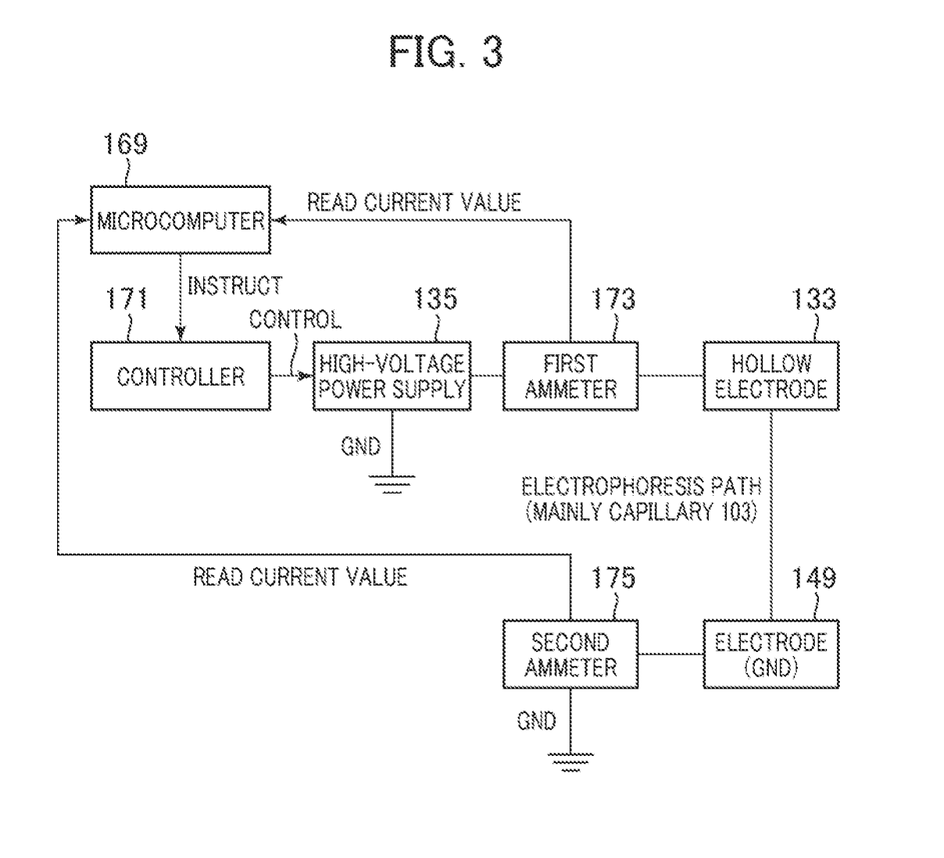
FIG. 3 is a high-voltage power supply circuit diagram showing a voltage control mechanism.

FIG. 3 is a high-voltage power supply circuit diagram showing a voltage control mechanism of the present device 101. Hereinafter, the voltage control mechanism will be described with reference to FIG. 3.

The voltage control mechanism includes a microcomputer 169, a controller 171, the high-voltage power supply 135, the first ammeter 173, and the second ammeter 175. The high-voltage power supply 135 applies a voltage to a conduction path, based on the control of the controller 171. The conduction path corresponds to the hollow electrode 133, a buffer 148 filled in the cathode buffer container 157, an electrophoresis path, the buffer 147 filled in the anode buffer container 139, and the electrode (GND) 149. The electrophoresis path corresponds to the polymer 107 filled in the capillary 103, the pump flow path 111, and the connecting pipe 143.

The high-voltage power supply 135 is conducted with the hollow electrode 133 via the first ammeter 173 and with the electrode (GND) 149 via the second ammeter 175. Although omitted in FIG. 1, a second ammeter 207 is connected to the microcomputer 169. When a voltage of several tens of kilovolts is applied, an electric field is generated from the hollow electrode 133 in the direction of the electrode (GND) 149. Due to the electric field, a sample such as negatively-charged nucleic acid moved from the capillary cathode end 131 to the capillary anode end 137.

The first ammeter 173 detects a current flowing from the high-voltage power supply 135 to the hollow electrode 133 and transmits the value thereof to the microcomputer 160. The second ammeter 175 detects a current flowing from the electrode (GND) 149 to GND and transmits the value thereof to the microcomputer 169.

The second ammeter 175 is usually used to check a current value and a fluctuation in current value, which will be described later. This is because it more directly reflects the current value flowing through the electrophoresis path. A medium having a relatively large resistance as compared with a metal, such as the buffer 147 (148) and the polymer 107 is interposed between the first ammeter 173 and the second ammeter 175. Further, there are many connecting parts such as the block 301 and the can array 105 between the first ammeter 173 and the second ammeter 175. Therefore, in the circuit of FIG. 2, it can be said that the region between the first ammeter 173 and the second ammeter 175 is a portion where noise is likely to occur in the measured current value. On the other hand, the numerical value shown by the second ammeter 175 is less likely to contain noise. The second ammeter 175 detects the net amount of current flowing through the electrophoresis path.

The microcomputer 169 reads the current value from the first ammeter 173 and the second ammeter 175 and performs an operation. Then, the microcomputer 169 instructs the controller 171 to control the high-voltage power supply 135 to each state such as high voltage application, low voltage application, and forced voltage cut-off. Further, it can communicate with the computer 117 arranged outside the electrophoresis device 101.

<Description of Configuration>

Description will be made as to abnormality detection in the present embodiment.

When replacing the capillary 103 or the polymer container 109 connected to the pump mechanism 113, foreign matter such as air bubbles and dust is mixed into the pump flow path 111 at high frequency.

Conventionally, when an abnormality is detected by current detection, the operator visually confirms the presence or absence of the foreign matter in the pump flow path 111 and takes predetermined measures according to the cause of the confirmed abnormality. When the foreign matter is confirmed in the pump flow path 111, the foreign matter is removed by circulating the polymer 107 in the pump flow path 111 by the pump mechanism 113.

However, it is difficult to see the foreign matter in the pump flow path 111. Also, it is difficult to specify the presence or absence of the foreign matter, which is very troublesome. In particular, it is hard to visually catch minute foreign matter. Further, in the case of the visual, confirmation, in addition to the above problem, a problem arises in that sine a person visually determines the presence or absence of the foreign matter, individual differences occur in the detection of the foreign matter.

When the electrophoresis is continued with the foreign matter mixed in the flow path including the capillary 103 and the pump flow path 111, the foreign matter may act as a large resistance, resulting in the risk of causing deterioration of analysis accuracy due to a conduction failure, damage to components due to partial discharge, etc. Even minute air bubbles may expand due to Joule heat during electrophoresis, block the flow path, and cause discharging. Further, when the foreign matter is mixed in the flow path during electrophoresis, the foreign matter may be detected as a peak. When the foreign matter is detected, the detection accuracy may be reduced. In order to eliminate these problems, automatic detection of the foreign setter has been required.

Therefore, in order to solve these problems, there is provided the photographing device 115 for imaging the pump flow path 111. The foreign matter in the pump flow path 111 is detected by an image of the pump flow path 111 acquired by the photographing device 115. It is desirable that the block 301 is transparent and is capable of visually recognizing the internal pump flow path 111.

The image of the pump flow path 111 acquired by the photographing device 115 can be image-analyzed by the computer 117 to detect the presence or absence of the foreign matter in the pump flow path 111. Consequently, the operability of the electrophoresis device 101 is improved, and the foreign matter can be detected with constant accuracy.

<Description of Operation>

Subsequently, the flow of foreign matter detection using images will be described in detail with reference to FIGS. 4 and 5.

Figure 4:
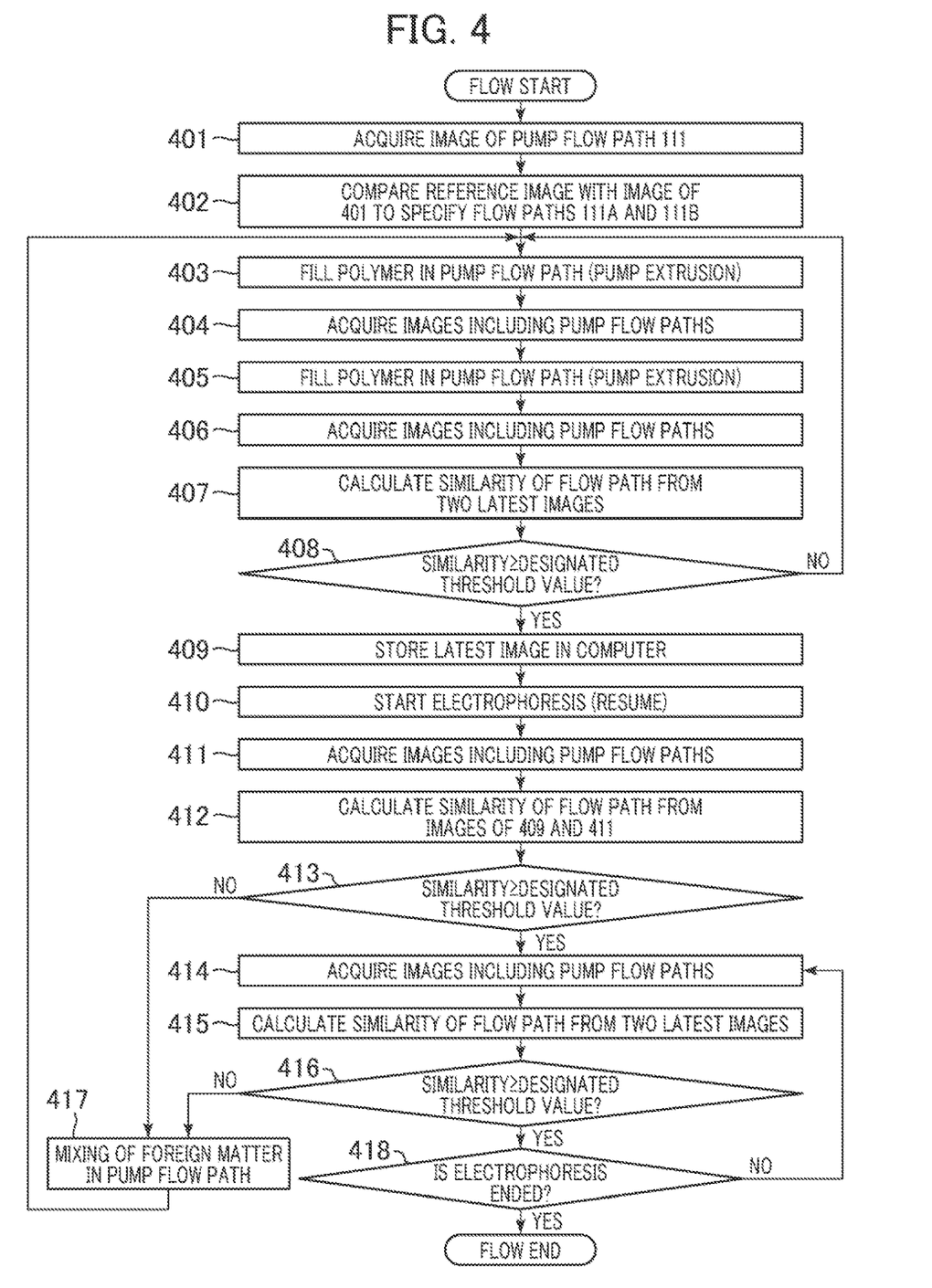
FIG. 4 is a flowchart of foreign matter detection by image detection.
Figure 5:
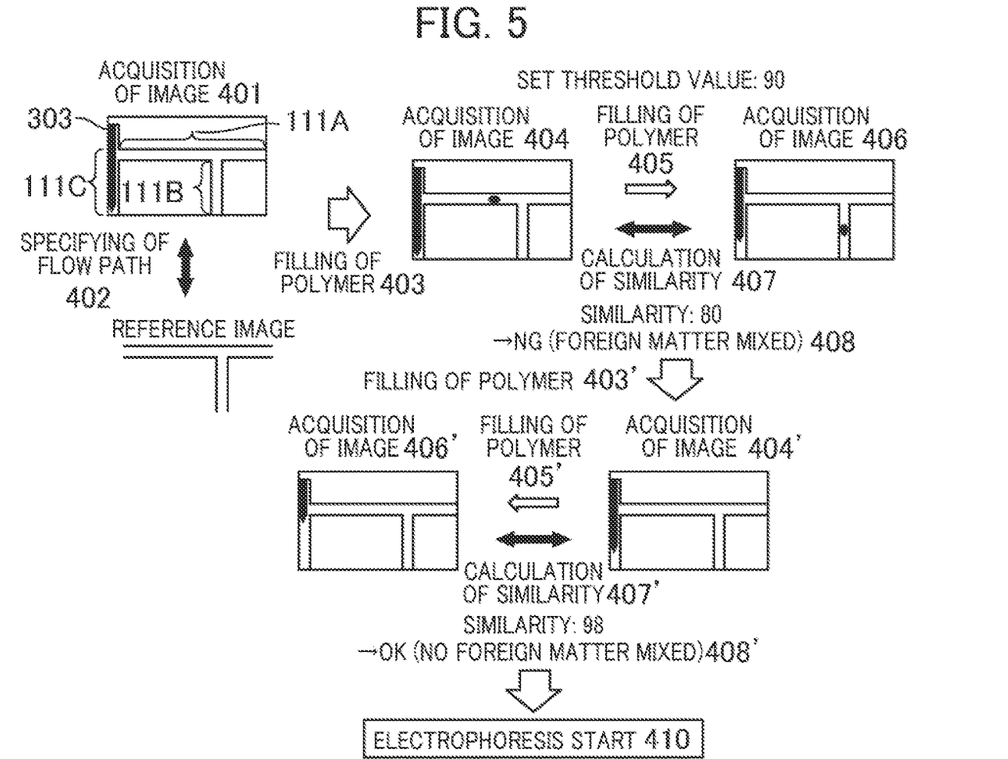
FIG. 5 is a diagram showing the flow of foreign matter removal in a flow path by image detection.

FIG. 4 is a flowchart for detecting the foreign matter in the pump flow path 111 from before a migration start to a migration end by image detection. FIG. 5 illustrates an example of a flow for removing the foreign matter in the pump flow path in Steps 401 to 410 of the flowchart of FIG. 4.

First, description will be made as to advanced preparations when using the device 101 for the first time. An image of the pump mechanism 113 is acquired in advance so as to include the pump flow path 111 (401).

A reference image for discriminating the pump flow path 111 is stored in the computer 117 in advance. The reference image is an image of the pump mechanism 113 acquired for each device after the device is manufactured.

The pump flow paths 111A and 111B are specified by comparing the reference image with the image of the pump mechanism 113 acquired in Step 401 (402).

Although the details will be described later, in the image detection of the foreign matter, the foreign matter is detected by comparing two images taken at a predetermined timing. The predetermined timing indicates the flow order and the time interval.

Since the plunger 303 or the like is driven in the pump mechanism 113, the plunger 303 becomes a Factor which changes the similarity of the image of the pump flow path 111C. Therefore, the pump flow paths 111A and 111B are specified so that the change in similarity due to the influence other than the foreign matter can be ignored. Further, since the photographing device 115 is fixed to the device, the images to be acquired become the same when once fixed.

However, when fixing the photographing device 115 in the manufacturing process, the fixing position may be slightly different for each device. Since it can be a detection error, the reference image is used to execute above Steps 401 and 402 in advance, so that more accurate abnormality detection becomes possible.

The device for which Steps 401 and 402 have been performed may be provided to the user, or the user may execute Steps 401 and 402 after the device is provided.

Next, the flow of foreign matter detection in the pump flow path 111 before the start of migration will be described. In the detection of the foreign matter before the migration start, the polymer 107 is fed to the pump flow path 111, and the polymer 107 in the pump flow path 111 is moved. The presence or absence of the foreign matter is determined by comparing the images of the pump flow path 111 acquired before and after the movement of the polymer 107.

First, the plunger 303 is moved by the drive unit 305 to fill the pump flow path 111 and the capillary 103 with the polymer 107 stored in the polymer container 109 (403).

The pump flow paths 111A and 111B filled with the polymer 107 are photographed by the photographing device 115 to acquire an image including the pump flow paths 111A and 111B (404).

The foreign matter detection by the image confirms the presence or absence of the foreign matter by moving the foreign matter by filling of the polymer 107. Therefore, the polymer 107 is sent again to move the polymer 107 in the pump flow path 111 (405).

The pump flow paths 1118 and 111B are photographed by the photographing device 115 to acquire images including the pump flow paths 111A and 111B (406).

Subsequently, the images including the pump flow paths 111A and 111E acquired in Steps 404 and 406 are compared. Using the images acquired in Steps 404 and 406, the similarity (0 to 100 by way of example) of the pump flow paths 1118 and 1115 specified in Step 402 is calculated (407).

The presence or absence of the foreign matter is determined by comparing the similarity obtained in Step 407 and a threshold value (408).

In the abnormality detection based on the current value as in Patent Literature 1, the current value changes depending on the length and number of capillaries 103 used, the type of polymer 107, etc. Therefore, it is necessary to experimentally perform a preliminary survey for each combination of many parameters such as the number and length of the capillaries 103, and the type of polymer 107, etc., and then set the threshold value. For the detection of the foreign matter by the image, it is not necessary to change the threshold value depending on the experimental conditions. The threshold value can be set to a fixed value, and the setting is easy.

When the similarity is smaller than a predetermined threshold value (similarity), it is determined that the foreign matter is mixed in the pump flow paths 111A and 111B. When the similarity is larger than the threshold value, it is determined that no foreign matter exists in the pump flow paths 111A and 111B. For example, in FIG. 5, the threshold value for determining the presence or absence of the foreign matter is set to 90, while the similarity obtained from the images acquired in Steps 404 and 406 is 80. Therefore, the obtained similarity is smaller than the threshold value, and the foreign matter is determined to have been mixed.

When it is determined that the foreign matter is mixed, Steps 403 to 408 are performed again to determine the presence or absence of the foreign matter in the pump flow paths 111A and 111B. In FIG. 5, when Steps 403 to 408 were repeated, the similarity became 98. When Steps 403 to 408 are performed repeatedly, all but the latest two images may be discarded, that is, the images acquired in the previously-executed Steps 403 to 408 may be discarded.

When it is determined in Step 408 that there is no foreign matter, the flow proceeds to electrophoresis.

When the foreign matter detection using the photographing device 115 is performed even during electrophoresis, the latest image acquired in Step 405 is stored in the computer 117 before the electrophoresis (409).

The image stored in the computer 117 becomes the first comparison image when detecting the foreign matter by the image during migration. Subsequently, a sample is injected into the capillary 103, and the electrophoresis is started (410).

In the detection of the foreign matter before the start of the migration, the movement of the foreign matter due to the feeding of the polymer 107 was detected. On the other hand, during the electrophoresis, a time change in foreign matter is detected. During the electrophoresis, a voltage is applied to the flow path such as the pump flow path 111, the capillary 103 or the like in order to perform the electrophoresis of the sample. Very small air bubbles or the like, which are not detected by the foreign matter detection before the migration, may expand due to Joule heat generated by voltage application and block the flow path. Therefore, it is preferable to detect an abnormality even during the electrophoresis.

Even during the electrophoresis as well as before the electrophoresis, images including the pump flow paths 111A and 111B are acquired at predetermined intervals. Then, the two latest images are compared to calculate the similarity, so that changes in foreign matter such as expansion of the foreign matter are detected, and hence the presence or absence of the foreign matter is determined.

The details of the foreign matter detection during the electrophoresis will be described.

The pump flow paths 111A and 111B are photographed by the photographing device 115 to acquire images including the pump flow paths 111A and 111B (411).

After that, the image acquired in Step 406, which is stored in the computer 117, and the images acquired in Step 411 are compared to calculate the similarity (0 to 100 by way of example) of the pump flow path 111A and 111B portions for the images acquired in Step 406 and the images acquired in Step 411 (412).

The presence or absence of the foreign matter is confirmed by comparing the similarity with a predetermined threshold value (413).

When it is determined by the computer 117 that there is no foreign matter, the sample is continuously electrophoresed. When it is determined that the foreign matter exists, the polymer 107 is sent to the pump flow path 111, and the flow returns to Step 403 to remove the foreign matter. Thus, when the foreign matter is detected, it is possible to return to Step 403 and automatically remove the foreign matter.

Since no foreign matter is detected when it is determined that the similarity is larger than the threshold value, the electrophoresis of the sample is continued, and the pump flow paths 111A and 111B are photographed again by the photographing device 126 (414).

The images acquired in Step 412, which are the latest two images, and the images acquired in Step 414 are compared to calculate the similarity (0 to 100 by way of example) of the pump flow path 111A and 111B portions for the two images (415).

The presence or absence of the foreign matter is confirmed by comparing the similarity calculated in Step 415 and a predetermined threshold value (416).

The loop of Steps 414 to 416 described above is repeated until the end of the migration (418).

In Step, 412, when the similarity between the pump flow path 111A and 111B portions in the images acquired in Step 406 and the images acquired in Step 411 is smaller than the threshold value (413), it is determined that the foreign matter is mixed in the pump flow path 111A or 111B (417).

When the mixture of the foreign matter is detected, the voltage application to the flow path is stopped, and the electrophoresis is stopped. Then, the flow returns to Step 403 before the electrophoresis, and the filling of the polymer 107 performed again to remove the foreign matter in the flow path, and the electrophoresis of the sample is resumed.

Steps 401 and 402 may be performed only when the device is used for the first time, and Step 403 is performed for the device in which Steps 401 and 402 have been performed once. Since Steps 401 and 402 are performed to correct the error between the devices, only the pump flow paths 111A and 111B can be compared from the subsequent images once the Steps are performed. Further, the polymer filling. In Step 403 is refilling of the polymer 107 for each measurement and liquid feeding of the polymer 107 for removing the foreign matter when the foreign matter is detected. On the other hand, the polymer filling in Step 405 is intended to move the foreign matter when it is in the flow path 111. Therefore, in Step 405, a smaller amount of polymer 107 may be fed as compared with Step 403.

In the electrophoresis device 101 of the present embodiment, since the capillary 103 is coated with polyimide, it is difficult to acquire the image of the inside of the capillary 103, and it is difficult to use the image detection in confirming the foreign matter in the capillary 103. Therefore, it is suitable to determine the state of the conduction path, based on the current value and perform the abnormality detection in addition to detecting the foreign matter in the pump flow path 111 by the above-described images. Although it is not possible to specify the presence or absence of the foreign matter in the confirmation of the state of the conduction path by the current value, it is possible to confirm abnormal circumstances such as an insufficient liquid amount in the buffer 147 (148), residual air bubbles in the pump flow paths including the pump flow path 111 and the capillary 103, mixing of the foreign matter, etc. Detecting an abnormality by the current detection makes it possible to avoid the danger of applying a high voltage as left in an abnormal state and causing discharge in the flow path.

Further, by using the image detection together with the current detection, it is possible to specify that the cause of the abnormality is the foreign matter in the pump flow path 111 or another cause. In the conventional abnormality detection by only current, when an abnormality is determined by the current value, the operator visually confirms whether air bubbles or foreign matter is mixed, and has taken predetermined measures according to the confirmed cause of errors. However, in the present embodiment, it is possible to specify that the location where the abnormality occurs is the pump flow path 111 or errors of other causes, or the like, and it is possible to present not only the error display but also a coping means. Further, when the foreign matter is detected in the pump flow path 111, the polymer can be automatically filled to remove the foreign matter. Consequently, when the cause of the error is the foreign matter in the pump flow path 111A or 111B, the error can be automatically resolved without requiring the operator to take action, and operators labor can be reduced. Even when the operator is not able to intervene for a long time such as at night, in the case of an error due to the foreign matter in the pump flow path 111A or 111B, the error can be automatically resolved, and the analysis can be continued.

A method of detecting an abnormality by the current value will be described.

In the detection of the abnormal before the electrophoresis, a voltage lower than the voltage when performing the electrophoresis is applied. The magnitude of the voltage is in such a degree that no discharge is performed even if an abnormal situation such as an insufficient liquid amount of the buffer 147 (148), residual air bubbles in the electrophoresis path, mixing of dust, or the like occurs. In the present embodiment, a voltage of 1 kilovolt is applied, and a current value is confirmed after another three seconds. This is to grasp the accurate current value corresponding to the voltage by considering a rising time of a current. A few seconds are enough for a waiting time. Further, the numerical value detected at this time is a value read from the second ammeter 175 which is on the anode side.

Next, a current check is performed. The current value detected by the aforementioned voltage application is compared with the threshold value. The threshold value is determined in consideration of parameters affecting the current value, such as the length of the capillary 103, the number of capillaries, and the type of polymer 107 used. Further, since the magnitude of the applied voltage differs between the abnormality detection before electrophoresis and during electrophoresis which is to be described later, it is better to determine an appropriate threshold value for each. When the current value is normal, it takes a stable value, and although it may fluctuate, with time, its degree is gentle. On the other hand, when the electrophoresis path is blocked by the foreign matter or the like, the current value fluctuates suddenly. Therefore, the degree of fluctuation in the current value, specifically, the gradient of the current value is monitored, so that an abnormality in the electrophoresis path which occurs during the voltage application can be instantaneously detected. Here, when the amount of decrease in the current value per unit time exceeds the threshold value, it is determined that an abnormality has occurred in the conduction path.

In fact, it is also possible to experimentally investigate the current value obtained under each use condition in advance, and to use a value of approximately one-half to one-third thereof as the threshold value. Then, when the current value is lower than the threshold value, states other than normal, e.g., factors that inhibit the current, such as the insufficient liquid amount of the buffer 147 (148), the residual foreign matter in the electrophoresis math, etc. as described above are presumed. Therefore, it is determined that there is an abnormality (error) in the electrophoresis path.

Figure 6:
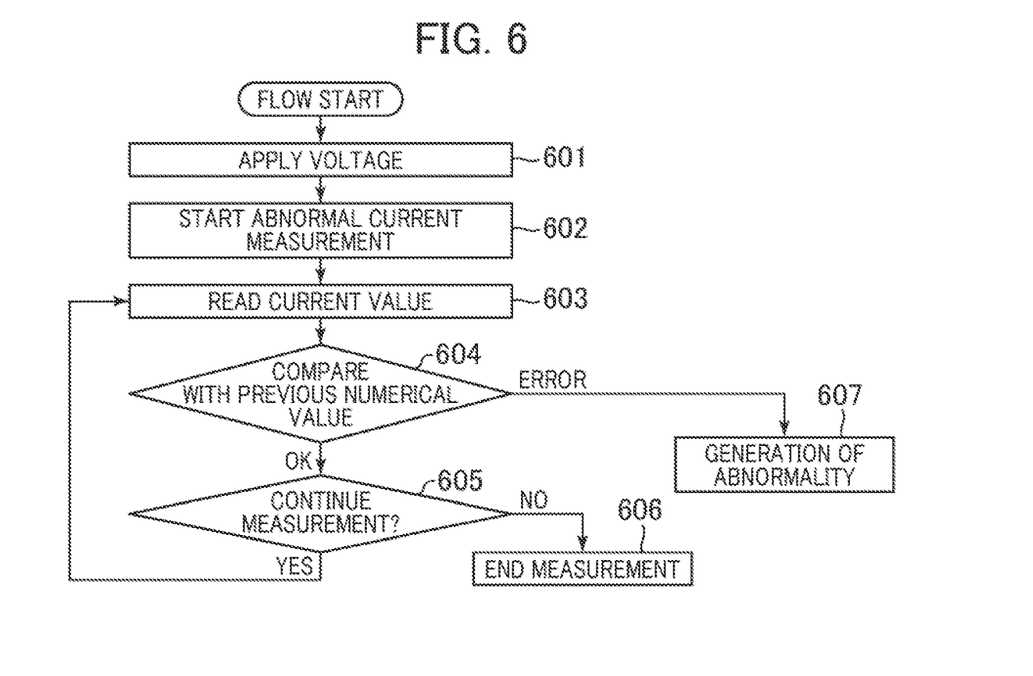
FIG. 6 is a flowchart of abnormality detection by current detection.

FIG. 6 is a diagram showing an abnormality detection flow in the electrophoresis path after the start of electrophoresis. Hereinafter, a method for detecting the generation of an abnormality in the electrophoresis path by monitoring a fluctuation in current value will be described with reference to FIG. 6.

First, voltage application is started, preliminary migration, sample introduction, or electrophoresis is started (601).

Subsequently, abnormal current measurement is started (602), and a current value is acquired from the second ammeter 175 (603).

If there is a current value acquired in the past, the current value and the past value are compared to determine the state of the conduction path (604).

When the current value is normal, it takes a stable value. Although it may fluctuate with time, its degree is gentle. On the other hand, when the electrophoresis path is blocked by air bubbles or the like, the current value fluctuates suddenly. Thus, by monitoring the degree of fluctuation in the current value, specifically, the gradient of the current value, it is possible to instantaneously detect an abnormality in the electrophoresis path that occurs during the voltage application. Here, when the amount of decrease in the current value per unit time exceeds the threshold value, it is determined that the abnormality has occurred in the conduction path. A countermeasure method when the abnormality occurs will be described later. If no abnormality is found in Step 604, it is confirmed whether the voltage is continuously applied (505).

When the voltage is continuously applied, Steps 603 to 605 are repeated (605).

When the voltage is cut off, the current value fluctuation monitoring is stooped to turn off the voltage (606).

Figure 7:
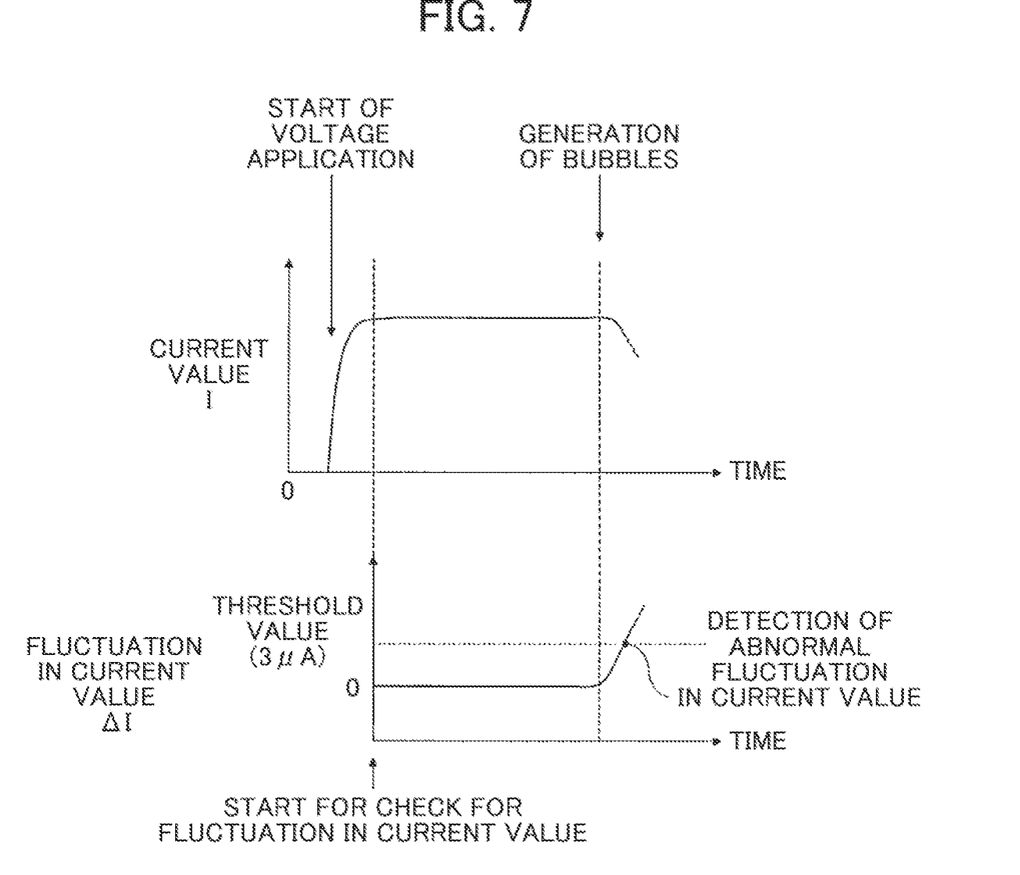
FIG. 7 is a schematic explanatory diagram of a change in current and current fluctuation detection.

FIG. 7 is a schematic explanatory diagram of a change in current and current fluctuation detection and shows a functional change from the start of measurement to the detection of an abnormality. Hereinafter, the change transition of an actual current value (I) and a fluctuation (ΔI) in current value will be described with reference to FIG. 7. In the upper figure of FIG. 7 the horizontal axis indicates the elapsed time, and the vertical axis indicates the current value. Also, this figure shows that after applying a voltage at a certain point, it becomes a stable state once, and the air bubbles expand as the temperature in the flow path rises, so that the air bubbles block the flow path at a certain point. Further, in the lower figure of FIG. 7, the horizontal axis indicates the elapsed time in like manner, and the vertical axis indicates the fluctuation in the current value obtained by, the method described in FIG. 8. In addition, this figure shows the fluctuation of the current value from the time when the current value becomes a stable state to the time of blocking of the flow path by the air bubbles.

As shown in the upper figure of FIG. 7, when a voltage is applied, a current corresponding to the voltage is generated. Actually, it takes some time from the voltage application to the rising of the current value (I), but if there is no abnormality in the electrophoresis path, it takes a stable value soon. Further, the current value (I) becomes constant even if minute air bubbles that do not block the flow path are mixed in the electrophoresis path. And then, when air bubbles having grown to the extent that they block the electrophoresis path are generated due to heat generated by the current or the like, the air bubbles become a large resistance component, so that the current value (I) is greatly reduced. Further, accidental accidents such as short circuit of a high-voltage power supply or a cutoff of an electrophoresis path due to an insulator also cause the drastic decrease in the current value as described above.

The fluctuation (ΔI) in the current value corresponding to this current change is as shown in the same lower figure. While the current value (I) is constant, the fluctuation (ΔI) in the current value keeps taking a value close to approximately zero. However, when air bubbles are generated and the current value (I) decreases, the fluctuation (ΔI) in the current value increases, and then when the set threshold value is reached, an abnormal fluctuation in the current value is detected.

In a system in which a current at the normal time flows about several hundred microamperes, the threshold value is set to several microamperes, it is possible to detect the abnormality in the electrophoresis math such as the generation of air bubbles by the methods described so far. Further, in the present embodiment, the fluctuation in the current value is checked by the microcomputer, but the check may be performed by the control computer 117, or a server for checking may be provided outside the device.

Description will be made as to countermeasures when an error is detected by abnormality detection using both image detection and current detection. When no error has occurred in both the image detection and the current detection, it can be determined that the state is normal. Therefore, the electrophoresis is started in the case of the abnormality detection before the electrophoresis, and the migration is continued as it is in the case of the abnormality detection during the electrophoresis.

There are three possible error patterns when the image detection and the current detection are used together, which are an error only for the image detection, an error for the current detection, and an error for the image detection and the current detection.

When the error is detected only by the image detection, it can be determined that there is foreign matter in the pump flow path 111A or 111B. In this case, the flow returns to Step 405, where the polymer is filled again, and the foreign matter is removed. Since the current detection detects an abnormality in the entire conduction path including the pump flow path 111 and the capillary 103, this state does not normally occur. When the similarity of images near the threshold value for determining the presence or absence of the foreign matter, for example, when the threshold value is taken as 90, is 88 to 89 or 91 to 92, the accuracy of abnormality detection is lacking. When the foreign matter is detected by the image detection, but no abnormality is detected by the current detection, the threshold value in the current detection may not be appropriate. Therefore, it is preferable to adjust the threshold value such as lowering the threshold value about 2 to 3 and perform the current detection again. By adjusting the threshold value in this way, a more optimal threshold value can be set, and more accurate abnormality detection becomes possible. Further, when no abnormality is detected by the current detection even if the threshold value is changed, a failure of the second ammeter 175 is suspected, and hence an alarm is issued to request the operator to confirm the second ammeter 175.

When the error is detected only by the current detection, it can be determined that an abnormality other than the foreign matter in the pump flow path 111 has occurred. In this case, even in addition to the mixing of the foreign matter in the capillary 103, there are various causes such as a shortage of the buffer 147 (148), breakage of the capillary 103, etc. Therefore, in this case, an alarm requesting the operator to take action is issued. The operator performs the replacement of the capillary array 105 when the foreign matter is mixed and the capillary 103 is broken, and the replenishment of the buffer 147 (148) when the buffer 147 (148) is insufficient, respectively. Since the cause of the error may be the foreign matter in the capillary 103, the flow returns to Step 405 where the polymer 107 is filled again. Thereafter, when the error of the current detection is not solved, the operator may be requested to take action. Further, since the threshold value in the image detection may not be appropriate, it is also preferable to adjust the threshold value in the image detection and determine again the presence or absence of ah abnormality by the image detection. Adjusting the threshold value enables more accurate abnormality detection.

When an error is detected by the image detection and the current detection, it is conceivable that foreign matter has occurred in the pump flow path 111, or that an abnormality has occurred in both the pump flow path 111 side and the capillary 103 side. Therefore, the flow returns to Step 405 as in the case where the error is detected only by the image detection, and the polymer filling is performed again to eliminate the error in the image detection first. Thereafter, when an error is detected only by the current detection, the above-described countermeasure taken when the error has occurred only by the current detection is performed, whereas when no error occurs, electrophoresis is started.

Figure 8:
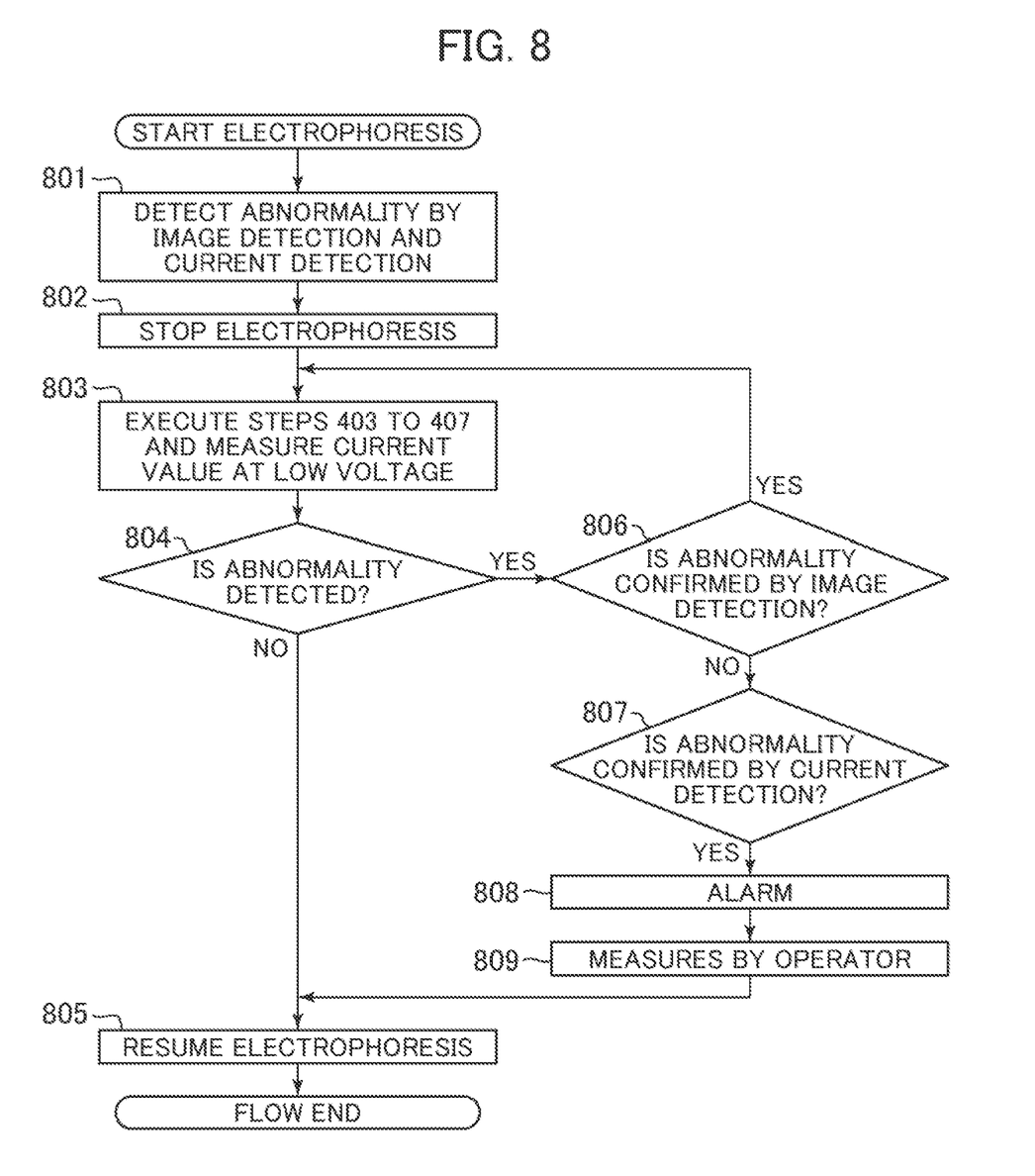
FIG. 8 is a flowchart showing a countermeasure method when an abnormality is detected by current detection and image detection.

As an example, a countermeasure method taken when an error occurs in current detection and image detection during electrophoresis will be described using the flowchart of FIG. 8.

During the electrophoresis, abnormalities are detected by the image detection and the current detection (801).

First, the migration is stopped to prevent a device failure (802).

When an error is detected in both the image detection and the current detection, it is conceivable that the foreign matter is generated in the pump flow path 111, or both abnormalities of the foreign matter in the pump flow path 111 and abnormalities other than the foreign matter in the pump flow path 111 have occurred. Therefore, in order to remove the foreign matter in the pump flow path 111A or 111B confirmed by the image detection, Step 407 is performed from the polymer filling in Step 403 of the flowchart of FIG. 4, and further a voltage lower than that during the electrophoresis is applied to perform the measurement of a current value (803).

It is confirmed again whether the abnormality is detected by the current detection and the image detection (804).

If no abnormality is detected in the image detection and the current detection, it can be determined that no foreign matter has been generated in the flow path including the pump flow path 111 and the capillary 103, so that the migration is resumed (905).

Further, the flow from Steps 801 to 805 is fully automatically performed. Thus, the foreign matter can be detected without human intervention, and the foreign matter can be detected with fixed accuracy without causing individual differences.

When an abnormality is detected by the image detection, the flow returns to Step 803 again, where the polymer 107 is filled to remove the foreign matter (806).

When no foreign matter is confirmed by the image detection, and an abnormality is detected by the current detection, it can be determined that abnormalities other than the foreign matter in the pump flow path 111 have been generated (807).

The abnormalities other than the foreign matter in the pump flow path 111 range from not only the mixing of the foreign matter in the capillary 103 to but also damage or the like due to the shortage in the buffer 147 (148), breakage of the capillary 103, or the like. Therefore, an alarm is issued (808) to request the operator to take measures (809).

After the measures taken by the operator are completed, the migration is resumed (805).

In the present flow, the migration is resumed immediately after the measures are taken by the operator in Step 809, but after the completion of the measures in Step 809, the current detection may be performed again to confirm whether the abnormality has been resolved.

In the present embodiment, the details thereof have been described on the assumption that the image is acquired by the photographing device 115, but the foreign matter can be detected even by photographing the flow path with a moving image and observing a time change in the acquired moving image. Further, when an infrared camera is used as the photographing device 115, it is possible to determine the presence or absence of foreign matter even if the pump flow path 111 is not transparent. The image analysis may be a widely general image analysis other than the method described, above. Further, the pump flow path does not have to be transparent as long as it is possible to determine the presence or absence of the foreign matter in the pump flow path 111.

Second Embodiment

In a second embodiment, an example of a liquid feeding method of the polymer 107 is shown.

In the first embodiment, the polymer filling of the pump flow path 111 and the polymer filling of the capillary 103 are not distinguished and are combined to result in polymer filling. In the abnormality detection using both the current detection and the image detection of the first embodiment, it is possible to specify whether the abnormal is the foreign matter in the pump flow path 111 or another abnormality such as breakage of the capillary. Therefore, the polymer filling in Step 403 to be performed again when the foreign matter is detected may be performed only by filling the polymer only at the location where the foreign manner is generated. Specifically, when the foreign matter is detected based on the image, the pump mechanism 113 feeds the migration medium from the polymer container 109 to the buffer solution container 139 through the flew paths 111A and 111B to remove the foreign matter in the pump flow path 111. On the other hand, when the foreign matter is detected based on the current value, the pump mechanism 113 feeds the polymer 107 from the flow path 111C to the capillary 103 through the flow path 111A. Since the generation location of the abnormality can be identified by using both the current detection and the image detection, it is possible to perform partial polymer filling. Consequently, the amount of consumption of the polymer 107 used to remove the foreign matter such as air bubbles can be reduced.

Third Embodiment

In the first embodiment, the capillary 103 is configured to cover the glass tube with polyimide, and the inside of the capillary 103 cannot be confirmed. Therefore, the image detection cannot be used to detect the foreign matter in the capillary 103, and the image detection is used only to detect the foreign matter in the pump, flow path 111 where the state inside the flow path can be confirmed. However, when electrophoresis is performed in a microflow path in which the inside of the path is visible, the identification of a state abnormal location using the image detection functions effectively in the microflow path in which the sample is electrophoresed. Further, in the first embodiment, the glass tube is coated with polyimide in order to improve the strength of the capillary 103, but when the coating material is transparent and visible, or when the capillary 103 is created by a material in which the coating is not required and the inside thereof is visible, it is possible to confirm the foreign matter in the capillary 103 by the image detection.

In the above embodiment, the fluid polymer 107 is used as the separation medium, but if the separation medium has fluidity, the identification of the state abnormal location in the microflow path using the image detection functions effectively.

Fourth Embodiment

In the first embodiment, the image detection and the current detection are performed in parallel during the electrophoresis according to the flow of FIG. 4, and the inside of the flow path including the pump flow path 111 and the capillary 103 is monitored. In a fourth embodiment, the inside of the flow path is monitored using only the current detection during electrophoresis. Only when an error due to current detection occurs during the electrophoresis of a sample, the pump flow path 111 is photographed to acquire an image, thereby confirming the presence or absence of foreign matter.

Consequently, it is not possible to improve the detection accuracy as in the case of detection using both the image detection and the current detection at all times, but confirmation of the foreign matter which has been visually made by the current detection can be automatically performed. It is possible to specify whether the error is the foreign matter in the pump flow path 111 or another cause or the like, and it is possible to present not only the error display but also the countermeasures. When the foreign matter is detected in the pump flow path 111, the polymer 107 is automatically filled, and hence the foreign matter can be removed. When the cause of the error is the foreign matter in the pump flow path 111, the error can be automatically resolved without requiring the operator to take action, and efforts related to the operator can be reduced. Further, since it is not necessary to continuously acquire and process an image, it is possible to use the image without requesting a processing capacity for the control unit, as compared with the first embodiment.

LIST OF REFERENCE SIGNS

301: electrophoresis device, 103: capillary, 105: capillary array, 107: polymer, 109: polymer container, 111: pump flow path, 113: pump mechanism, 115: photographing device, 117: computer, 119: communication cable, 121: detection unit, 123: load header, 125: capillary head, 127: light source, 129: optical detector, 131: capillary cathode end, 133: hollow electrode, 135: high-voltage power supply, 137: capillary anode end, 139: anode buffer container, 141: check valve, 143: connecting pipe, 145: electric valve, 147, 148: buffer, 149: electrode (GND), 151: optical detector, 153: thermostatic bath, 155: conveyor, 157: cathode buffer container, 159: cleaning container, 161: waste liquid container, 163: sample container, 165: moving stage, 167: grip, 169: microcomputer, 171: controller, 173: first; ammeter, 175: second ammeter, 301: block, 303: plunger, 305: drive unit.

The invention claimed is:

1. An electrophoresis device including a flow path filled thereinside with a migration medium, a migration medium container which stores the migration medium, and a liquid feeding mechanism which feeds the migration medium to the flow path, the electrophoresis device comprising:
a photographing device configured to photograph the flow path; and
a control unit configured to analyze an image of the flow path photographed by the photographing device,
wherein the control unit determines the presence or absence of foreign matter in the flow path on the basis of the image of the flow path;
wherein the photographing device is configured to photograph the flow path at a predetermined timing to acquire a first image of the flow path and a second image of the flow path;
the control unit is configured to compare the first image with the second image to determine the presence or absence of the foreign matter; and
wherein the control unit is configured to determine a part of the flow path for each of the first image and the second image and compare images acquired by the photographing device of the part of the flow path for the first image with the part of the flow path for the second image to determine the presence or absence of the foreign matter.

2. The electrophoresis device according to claim 1, wherein the control unit has a reference image for discriminating parts of the flow path and is configured to determine a position of the flow path from each of the first image and the second image by comparing the first image and the second image with the reference image.

3. The electrophoresis device according to claim 1, wherein while the photographing device is configured to acquire the first image and then acquire the second image, the liquid feeding mechanism feeds a migration medium to the flow path and moves the migration medium in the flow path.

4. The electrophoresis device according to claim 1, including a power supply which applies a voltage to a conduction path including the flow path,
wherein while the photographing device acquires the first image and then acquires the second image, a voltage is applied to the flow path.

5. The electrophoresis device according to claim 1, wherein when the foreign matter is detected by the control unit, the liquid feeding mechanism is configured to feed a migration medium to the flow path.

6. The electrophoresis device according to claim 1, including an ammeter configured to detect a current flowing through the conduction path including the flow path,
wherein the control unit is configured to determine the presence or absence of an abnormality in the conduction path, based on the value of the current.

7. The electrophoresis device according to claim 6, wherein a similarity between the first image and the second image and a predetermined first threshold value are compared with each other to determine the presence or absence of the foreign matter on the basis of the first threshold value, and
wherein abnormality detection by the current value comprises performing a comparison between the current value and a second threshold value to determine the presence or absence of an abnormality on the basis of the second threshold value.

8. The electrophoresis device according to claim 7, wherein when the foreign matter is detected on the basis of the first threshold value, and the abnormality is not detected in the abnormality detection by the current value, the second threshold value is lowered.

9. The electrophoresis device according to claim 7, wherein when the abnormality is detected in the abnormality detection by the current value, and the foreign matter is not detected in the foreign matter detection by the image, the first threshold value is adjusted.

10. The electrophoresis device according to claim 6, wherein when the foreign matter is detected based on the image, and the abnormality is not detected based on the current value, the control unit indicates a failure of the ammeter.

11. The electrophoresis device according to claim 6, wherein when foreign matter is not detected based on the image, and the abnormality is detected based on the current value, the control unit indicates the abnormality.

12. The electrophoresis device according to claim 6, including:
- a capillary which performs electrophoresis of a sample thereinside; and
  - a buffer solution container which stores a buffer solution for applying a voltage to the capillary,
  - wherein the flow path connects the capillary and the migration medium container and connects the capillary and the buffer solution container,
  - wherein when foreign matter is detected based on the image by the control unit, the liquid feeding mechanism feeds a migration medium from the migration medium container to the buffer solution container, and
  - wherein when an abnormality is detected based on the current value, the liquid feeding mechanism feeds the migration medium from the migration medium container to the capillary.

13. The electrophoresis device according to claim 6, wherein when the abnormality is detected based on the current value, the photographing device acquires the image.

14. A method for detecting foreign matter in a flow path filled thereinside with a migration medium, comprising the steps of:
- comparing a first image of the flow path with a second image of the flow path each photographed at a predetermined timing;
- thereby detecting the foreign matter in the flow path;
- determining a part of the flow path associated with each of the first image and the second image; and
- comparing the part of the flow path associated with the first image with the part of the flow path associated with the second image to determine the presence or absence of the foreign matter.

* * * * *